(12) United States Patent
Yona et al.

(10) Patent No.: US 7,110,184 B1
(45) Date of Patent: Sep. 19, 2006

(54) METHOD AND APPARATUS FOR COMBINING AN INDUCED IMAGE WITH A SCENE IMAGE

(75) Inventors: Zvi Yona, Karkur (IL); Aron Arlievsky, Tirat HaKarmel (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 11/181,465

(22) Filed: Jul. 13, 2005

Related U.S. Application Data (60) Provisional application No. 60/589,043, filed on Jul. 19, 2004.

(51) Int. Cl.
*G02B 27/14* (2006.01)
*G09G 5/00* (2006.01)

(52) U.S. Cl. .................... 359/630; 359/634; 345/7
(58) Field of Classification Search ........... 359/629, 359/631, 634, 639, 630; 345/7–9
See application file for complete search history.

(56) References Cited

U.S. PATENT DOCUMENTS

| | | | |
|---|---|---|---|
| 4,249,797 A | 2/1981 | Sendecki | |
| 4,629,295 A | 12/1986 | Vogl | |
| 4,818,065 A | 4/1989 | Ziph et al. | |
| 5,113,177 A | 5/1992 | Cohen | |
| 6,629,295 B1 | 5/2000 | Carmeli et al. | |
| 6,937,221 B1 * | 8/2005 | Lippert et al. | ................. 345/7 |

OTHER PUBLICATIONS

E.F. Genaw and E. K. Nelson of Tracor Aerospace Dayton, OH and K.F. Walsh of Rochester Photonics Corporation, Rochester, NY, "Tracor Flat Panel ANVIS E-HUD" Part of the SPIE Conference on Helmet and Head-Mounted Displays III, Orlando, Florida, Apr. 1988, SPIE vol. 3362, pp. 340-346.

* cited by examiner

*Primary Examiner*—Alicia M Harrington
(74) *Attorney, Agent, or Firm*—Edwards Angell Palmer & Dodge LLP (57) ABSTRACT

Device for combining a scene image, produced by an imaging system, with an induced image, the imaging system including an eyepiece optics and at least a display screen producing the scene image, the eyepiece optics being located between the display screen and the eye of the observer, the device including an optical director projecting the induced image toward a diffusive surface, the diffusive surface being located between the display screen and the eyepiece optics, wherein the diffusive surface reflects the induced image back, toward the observer, through the eyepiece optics, and wherein the diffusive surface transmits the scene image from the display screen toward the observer, through the eyepiece optics.

20 Claims, 8 Drawing Sheets

METHOD AND APPARATUS FOR COMBINING AN INDUCED IMAGE WITH A SCENE IMAGE

CROSS-REFERENCE TO RELATED CASE

This application is based on and claims priority to and the benefit of Provisional U.S. Patent Application Ser. No. 60/589,043 which was filed on Jul. 19, 2004. The entirety of this application is incorporated herein by reference.

FIELD OF THE DISCLOSED TECHNIQUE

The disclosed technique relates to combining images in general, and to methods and systems for combining images with scene images, which are produced by imaging system.

BACKGROUND OF THE DISCLOSED TECHNIQUE

A light intensifying apparatus, is an apparatus, which enables an observer, to observer hers or his surroundings at very poor light conditions, which is know in the art. A light intensifying apparatus intensify the existing reflected light beams of the surroundings on any specular reflective surface. The reflected light beams of the surroundings may be visible, infrared or any other desired form of electromagnetic energy radiation.

Figure 1A:
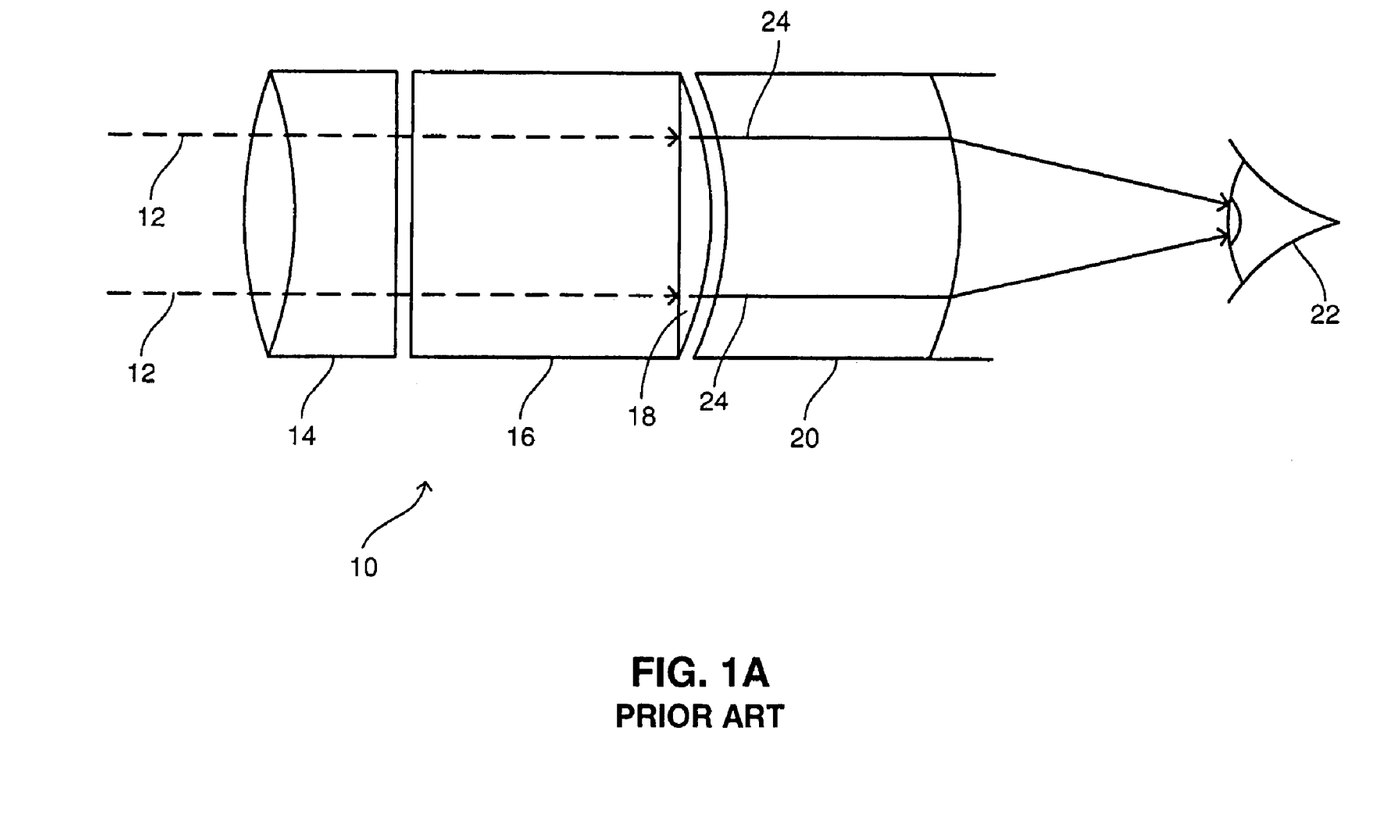
FIG. 1A is a schematic illustration of a light intensifying apparatus, which is known in the art.

Reference is now made to FIG. 1A, which is a schematic illustration of a light intensifying apparatus, generally referenced 10, which is known in the art. Apparatus 10 is operative to receive light beams from its surroundings, intensify the received light beams and display the intensified light beams to an observer, as an image. The image may cover the entire Field Of View (FOV) of the observer. Apparatus 10 includes an objective optics 14, eyepiece optics 20 and a light intensifier 16. Light intensifier 16 includes a fluorescent screen 18. Light intensifying tube 16 is located between objective optics 14 and eyepiece optics 20 with fluorescent screen 18 facing eyepiece optics 20.

Light beams 12 pass through the objective optics 14 into light intesifier 16. Light intensifier 16 converts light beams 12 to electrons (not shown). Light intensifier 16 projects the electrons onto the back of fluorescent screen 18. The electrons excite the fluorescent substance forming an image (not shown), representing the scene (not shown), on fluorescent screen 18. Light beams 24, representing the intensified image, are projected from fluorescent screen 18 to eyepiece optics 20. Light beams 24 pass through eyepiece optics 20 to observer 22. The image represented by light beams 24 may be magnified. Observer 22 directs objective optics 14 in the direction of the observed scene (not shown). Observer 22 observes an intensified image (not shown) of the observed scene through eyepiece optics 20.

It is often advantageous to combine two different images, a scene image and an induced image and display the combined image in a light intensifying apparatus. For example, in an aircraft's cockpit environment, an image of some data about some mission is generated externally to the light intensifying apparatus. The data image is induced upon the image of the surroundings. A combined image is displayed to the pilot through an eyepiece. The apparatus, which combines and displays the images, is known in the art as an Eyepiece Heads Up Display (E-HUD). U.S. Pat. No. 4,818,065 issued to Ziph et al entitled "Optical Device Particularly Useful As Night Vision Goggles" is directed to an apparatus that combines two images by placing a beam combiner between an observed scene and the objective optics. A beam combiner is a device, known in the art, that is transparent to light beams incident from one direction and is reflects light beams incident from a different direction. Consequently, the observer observes the representation of a combination of two images.

Figure 1B:
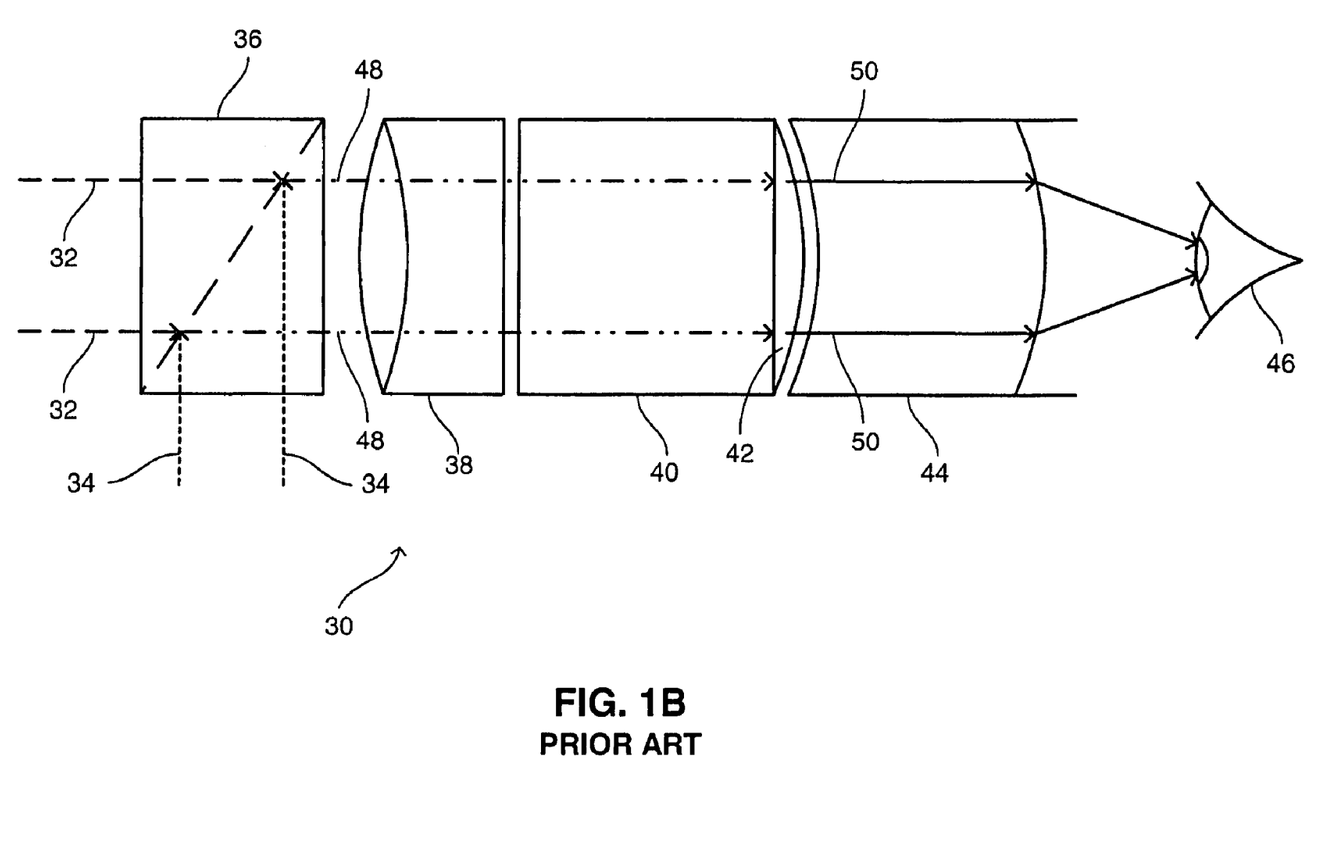
FIG. 1B is a schematic illustration of an image combining apparatus, which is know in the art.

Reference is now made to FIG. 1B, which is a schematic illustration of an image combining apparatus, generally referenced 30, which is know in the art. Apparatus 30 is operative to combine two distinct images by placing a beam combiner between the observed scene and the objective optics. The beam combiner projects the light beams of the combined image towards the objective optics. Apparatus 30 includes a beam combiner 36, an objective optics 38, eyepiece optics 44 and a light intensifier 40 similar to the one in FIG. 1A. Light intensifier 40 includes a fluorescent screen 42. In apparatus 30, beam combiner 36 is located between the observed scene (not shown) and the objective optics 38. Light intensifier 40 is located between eyepiece optics 44 and objective optics 38 with fluorescent screen 42 facing eyepiece optics 44.

Light beams 32 of the scene image (not shown) and light beams 34 of the induced image (not shown) enter beam combiner 36 from non-collimated directions. Beam combiner 36 combines light beams 32 and Light beams 34. Beam combiner 36 reflects light beams 48 of the combined image in the direction of objective optics 38. Light beams 48 pass through objective optics 38 into light intensifier 40. An intensified image (not shown), representing the combined image (not shown) is formed on fluorescent screen 42. Light beams 50, of the image formed on fluorescent screen 48, are projected through eyepiece optics 44 towards observer 46.

U.S. Pat. No. 4,629,295 issued to Vogl and entitled "Night Vision Instrument With Electronic Image Converter", is directed to a device that combines two images by placing a beam combiner between light intensifier and the eyepiece optics. Light beams projected from a fluorescent display enter the beam combiner from one direction. Light beams of a second image enter the beam combiner from another direction. The combined beams are projected towards the eyepiece optics. Thus, the observer observes the representation of a combination of two images.

U.S. Pat. No. 6,061,182 issued to Carmeli et al. entitled "Combiner For Superimposing a Display Image On To An Image Of An External Scene" is directed to a device that combines two images by placing a beam combiner within the eyepiece optics. Light beams of an image enter the eyepiece optics from one direction. Light beams of another image enter eyepiece optics from another direction. An image combiner placed within eyepiece optics combines the light beams. The beams of the combined image are projected towards an observer. Thus, the observer observes the representation of a combination of two images.

Figure 1C:
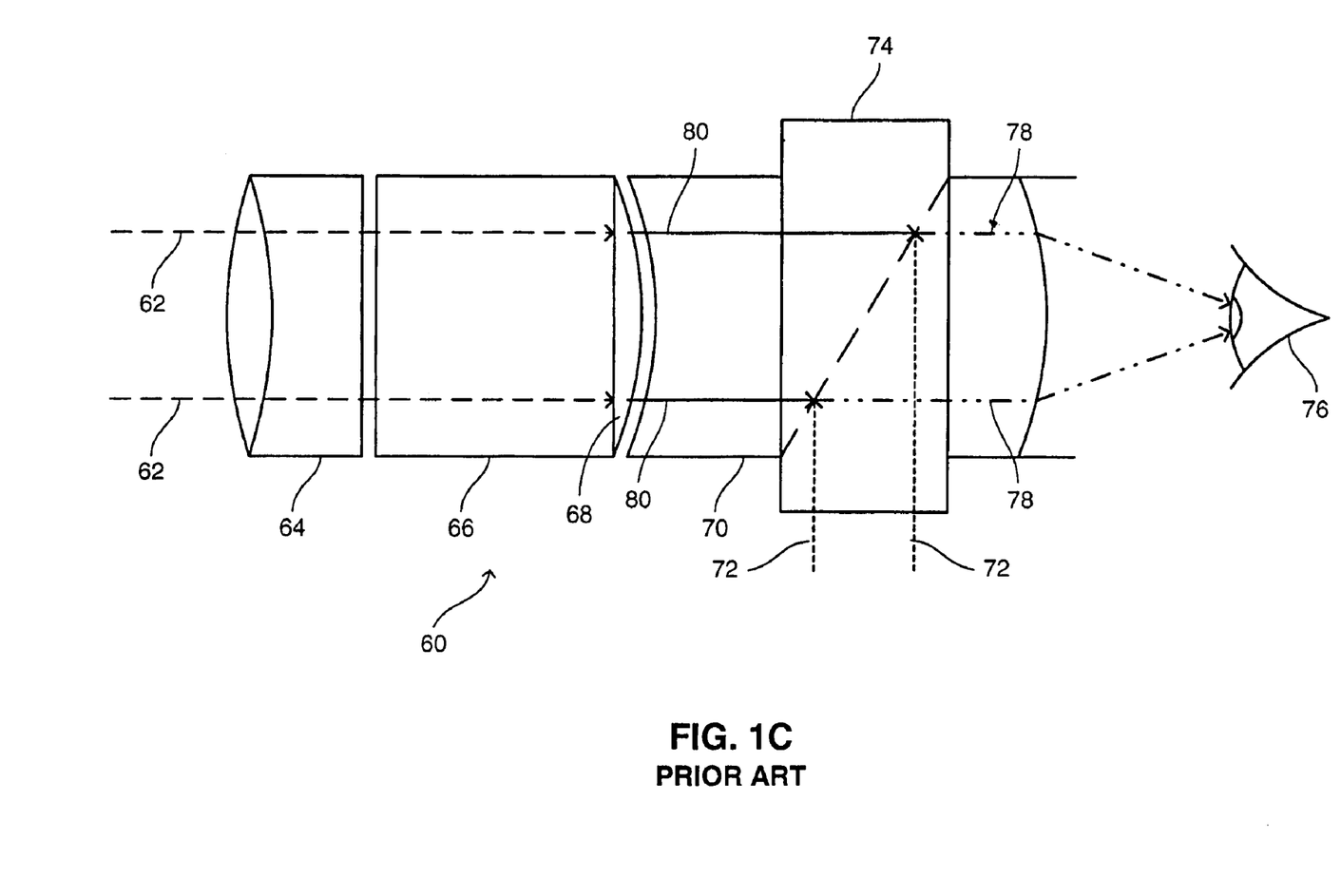
FIG. 1C is a schematic illustration of an image combining apparatus, which is know in the art.

Reference is now made to FIG. 1C, which is a schematic illustration of an image combining apparatus, generally referenced 60, which is know in the art. Apparatus 60 is operative to combine two distinct images by placing a beam combiner within the eyepiece optics. Apparatus 60 includes an objective optics 64, a beam combiner 74, eyepiece optics 70 and, a light intensifier 66 similar to the one in FIG. 1A. Light intensifier 66 includes a fluorescent screen 68. Beam combiner 74 is located within eyepiece optics 70. Light intensifier 66 is located between objective optics 64 and eyepiece optics 70 with fluorescent screen 68 facing the eyepiece optics 70.

Light beams 62 of the scene image (not shown) pass through the objective optics 64 into light intensifier 66. An intensified image (not shown) representing the scene (not shown) is formed on fluorescent screen 68. Light beams 80, of the image formed on fluorescent screen 68, are projected from fluorescent screen 68 into eyepiece optics 70. Light beams 72 of the induced image (not shown) enter eyepiece optics 70 from a non-collimated direction to that of light beams 80. Beam combiner 74 within eyepiece optics 70, combines light beams 80 and light beams 72 to form light beams 78 of the combined image. Light beams 78 are projected from eyepiece optics 70 towards observer 76.

SUMMARY OF THE PRESENT DISCLOSED TECHNIQUE

It is an object of the disclosed technique, to provide a novel method and system for combining an induced image with a scene image, which overcomes the disadvantages of the prior art. In accordance with an aspect of the disclosed technique, there is thus provided a device for combining a scene image, produced by an imaging system, with an induced image. The imaging system includes eyepiece optics and at least a display screen producing the scene image. The eyepiece optics is optically located between the display screen and the eye of the observer. The device includes an image director and a diffusive surface. The diffusive surface is located between the display screen and the eyepiece optics. The image director projects the induced image toward the diffusive surface. The diffusive surface reflects the induced image back, toward the observer, through the eyepiece optics. The diffusive surface transmits the scene image from the display screen toward the observer, through the eyepiece optics.

According to another aspect of the disclosed technique there is thus provided an image combining system. The image combining system includes eyepiece optics and at least a display screen producing a scene image. The eyepiece optics is optically located between the display screen and the eye of an observer. The system further includes a diffusive surface, located between the display screen and the eyepiece optics and an image director, projecting an induced image toward the diffusive surface. The diffusive surface reflects the induced image back, toward the observer, through the eyepiece optics. The diffusive surface transmits the scene image from the display screen toward the observer, through the eyepiece optics.

According to a further aspect of the disclosed technique, there is thus provided a method for combining a scene image, produced by an imaging system, with an induced image. The imaging system includes eyepiece optics and at least a display screen producing the scene image. The eyepiece optics is optically located between the display screen and the eye of the observer. The method includes the procedures of directing the induced image toward a diffusive surface, reflecting the induced image back, toward the observer, through the eyepiece optics, and transmitting the scene image by the diffusive surface, from the display screen toward the observe, through the eyepiece optics. The diffusive surface is located between the display screen and the eyepiece optics.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing an image combining apparatus which combines a scene image, produced by an imaging system, with an induced image, by projecting the induced image from the eyepiece side, onto a diffusive surface, which is optically adjacent to the display screen producing the scene image. Both images are projected towards an observer.

The eyepiece is located between the display screen producing the scene image and the eye of the observer. The diffusive surface is located adjacent to the display screen or is combined therewith. The induced image is projected from the observer side, toward the diffusive surface, through the eyepiece optics. The diffusive surface diffusively reflects the induced image through the eyepiece optics toward the observer. In addition, the scene image is available to the observer, through the diffusive surface and the eyepiece. It is noted that the diffusive surface can either be fully diffusive or partially diffusive.

According to the disclosed technique, the diffusive surface can be separate from the display screen or be combined therewith. For example, the diffusive surface may be the outer glass surface of the fluorescent screen of an image generating device such as an image intensifier. Alternatively, a diffusive surface may be added to the image generating device (e.g., CCD, FLIR).

The scene image is typically reproduced by an image generating device, such as an image intensifier, FLIR, CCD, active or passive mm wave, radar, and the like. The image generating device may be a real or synthetic image generating device, operating in any frequency or spectral band, having a diffusive surface at the eye side.

In the example of an image intensifier, the image of an observed scene is formed on the back of the diffusive surface. According to the disclosed technique, an external image source, projects a narrow field of view (FOV) induced image light beams towards the diffusive surface from the eyepiece side of the surface. The diffusive surface, which possess diffusive reflective properties, reflects the induced image back, towards an observer.

The external image source is placed anywhere within or out of the FOV of the eyepiece optics. The external image source projects a narrow FOV image onto the diffusive surface through the eyepiece optics. By passing through the eyepiece optics, the induced light beams are disseminated. The disseminated induced light beams incident on the diffusive surface, covers (i.e., either entirely or partially) the diffusive surface producing a wide FOV image. Both the scene image and the induced image are available to the observer through the eyepiece, traverse a similar optical path (i.e., the eyepiece optical path) thereby exhibiting similar optical properties.

Figure 2:
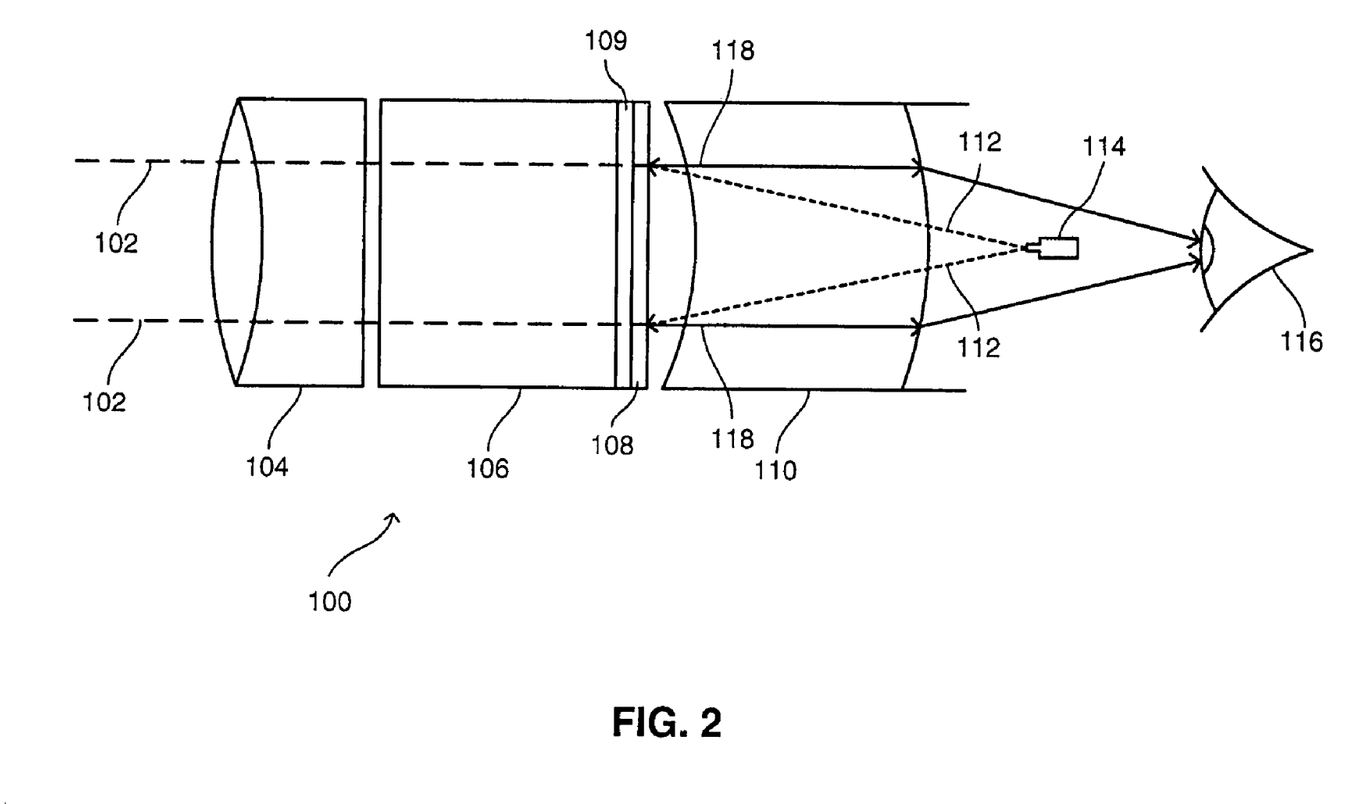
FIG. 2 is a schematic illustration of an apparatus for combining images, constructed and operative in accordance with an embodiment of the disclosed technique.

Reference is now made to FIG. 2, which is a schematic illustration of an apparatus, generally referenced 100, constructed and operative in accordance with an embodiment of the disclosed technique. Apparatus 100 includes an objective optics 104, eyepiece optics 110, an induced image source 114, a diffusive surface 108 and an image generator 106 having a display screen 109. diffusive surface 108 is located between eyepiece optics 110 and display screen 109. Image generator 106 is located between display screen 109 and objective optics 104. Induced image source 114 is located between eyepiece optics 110 and observer 116.

Induced image source 114 is an image director operative to direct an image. According to the disclosed technique, such an image director is small in size and essentially does not disturb the FOV of observer 316. Image source 114 can either include an image generating unit (e.g., Organic LED display, LCD display, Plasma display, CRT, Laser source or a combined image source) or an image director which directs an image received from an optically associated image generating unit. Image generator 106 may be any device operative to receive image oriented electromagnetic radiation energy, manipulate (e.g., amplify) the electromagnetic energy, and provide an image, representing the manipulated electromagnetic energy, on display screen 109. diffusive surface 108 is a translucent surface possessing diffusive reflective properties.

In the example set forth in FIG. 2, image generator 106 is a light intensifier. Accordingly, display screen 109 is of fluorescent type and diffusive surface 108 is formed on the outer surface glass, which is internally coated with fluorescent display screen 109.

Light beams 102, of the scene image (not shown), pass through objective optics 104 into image generator 106. Image generator 106 generates an image of the scene on display screen 109. Display screen 109 projects the generated image through diffusive surface 108 towards eyepiece optics 110.

Induced image source 114 projects light beams 112 through eyepiece optics 110 towards diffusive surface 108. Passing through eyepiece optics 110, disseminates light beams 112, thereby creating a wide FOV image on diffusive surface 108. diffusive surface 108 diffusively reflects light beams 112 backward through eyepiece optics 110, toward to the observer. Thus, diffusive surface 108 combines the induced image light and the scene image and projects both through eyepiece optics 110, as light beams 118, toward observer 116, using the entire FOV, available by eyepiece optics 110.

Figure 3:
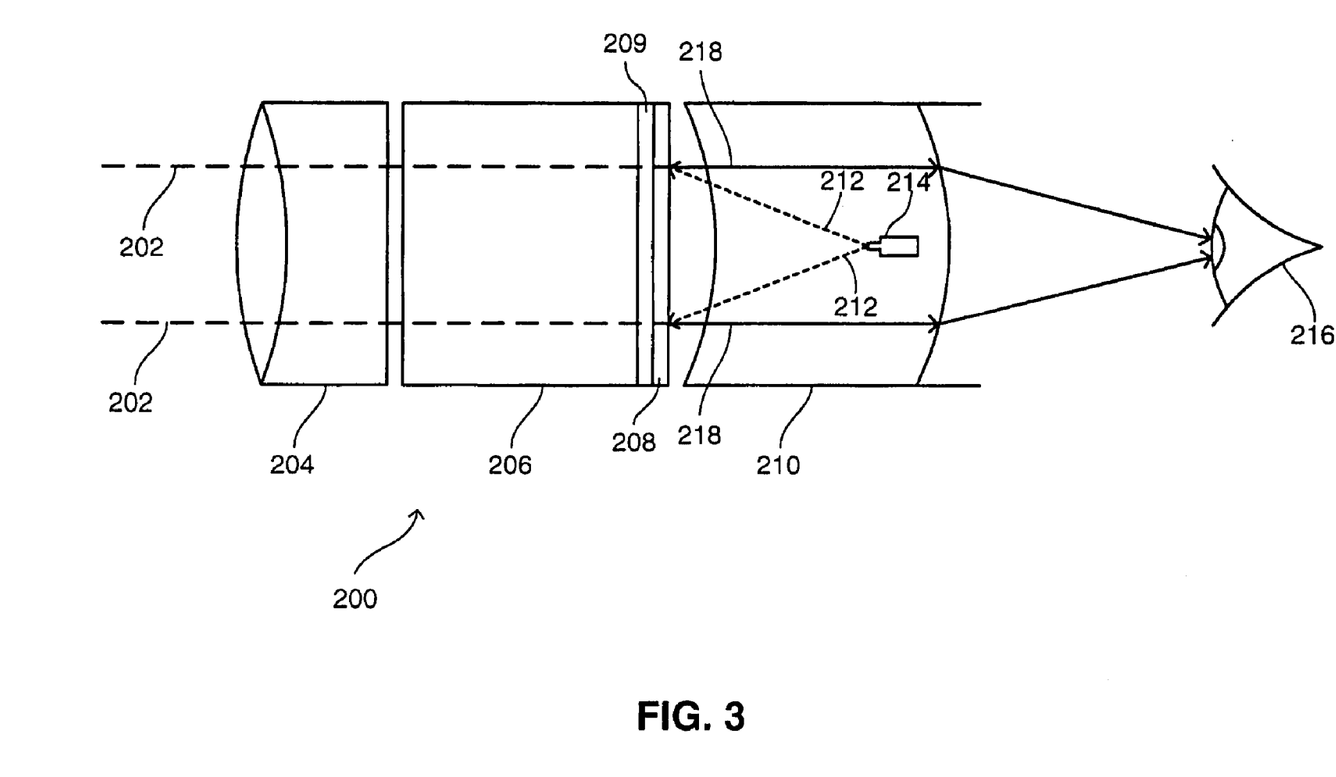
FIG. 3 is a schematic illustration of an apparatus for combining images, constructed and operative in accordance with another embodiment of the disclosed technique.

According to another embodiment of the disclosed technique, the induced image source may be located inside the eyepiece optics. Reference is now made to FIG. 3, which is a schematic illustration of an image combining apparatus, generally referenced 200, constructed and operative in accordance with another embodiment of the disclosed technique. Apparatus 200 includes objective optics 204, eyepiece optics 210, an induced image source 214 (i.e., an image director), an image generator 206, a diffusive surface 208 and an image generator 206 having a display screen 209. diffusive surface 208 is located between eyepiece optics 210 and display screen 209. Image generator 206 is located between display screen 209 and objective optics 204. Induced image source 214 is located within eyepiece optics 210. Induced image source 214 is small in size and essentially does not disturb the FOV of observer 216.

Light beams 202, of the scene image (not shown), pass through objective optics 204 into image generator 206. Image generator 206 generates an image of a scene on display screen 209. Display screen 209 projects the generated image though diffusive surface 208 towards observer 216, via eyepiece optics 210.

Induced image source 214 projects light beams 212 through eyepiece optics 210 towards diffusive surface 208. Passing through eyepiece optics 220, disseminates light beams 212, thereby creating a wide FOV image on diffusive surface 208. diffusive surface 208 diffusively reflects light beams 212 backward through eyepiece optics 210, toward to the observer. Thus, diffusive surface 208 combines the induced image light and the scene image and projects both through eyepiece optics 210, as light beams 218, toward observer 216, using the entire FOV, available by eyepiece optics 210.

According to a further embodiment of the disclosed technique, the image source can be located inside or outside the eyepiece optics but off the main optical axis of the light beams passing through the eyepiece optics.

Figure 4:
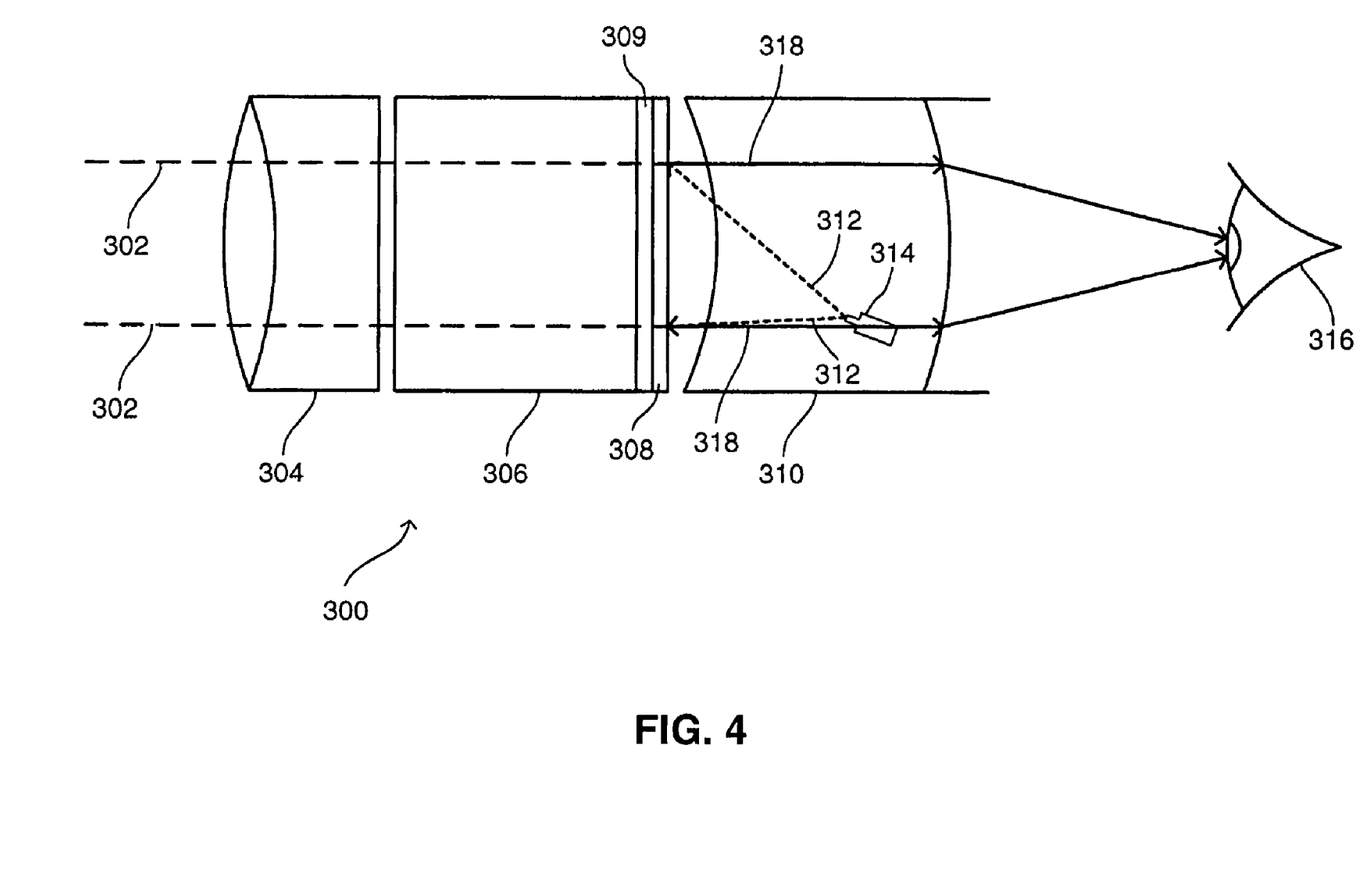
FIG. 4 is a schematic illustration of an image combining apparatus, constructed and operative in accordance with a further embodiment of the disclosed technique.

Reference is now made to FIG. 4, which is a schematic illustration of an image combining apparatus, generally referenced 300, constructed and operative in accordance with a further embodiment of the disclosed technique. Apparatus 300 includes an objective optics 304, eyepiece optics 310, an induced image source 314 (i.e., an image director), an image generator 306, a diffusive surface 308 and an image generator 306 having a display screen 309. diffusive surface 308 is located between eyepiece optics 310 and display screen 309. Image generator 306 is located between display screen 309 and objective optics 304. Induced image source 314 is located within eyepiece optics 310. Induced image source 314 is located off the main optical axis of the light beams passing through eyepiece optics 310. Alternatively, induce image source 314 may be located outside eyepiece optics and of the optical axis of the light beams passing through eyepiece optics 310. Induced image source 314 is small in size and inflicts a negligible disturbance to the FOV of observer 316.

Light beams 302, of the scene image (not shown) pass through objective optics 304 into image generator 306. Image generator 306 generates an image of the scene on display screen 309. Display screen 309 projects the generated image through diffusive surface 308 towards eyepiece optics 310.

Induced image source 314 projects light beams 312 through eyepiece optics 310 towards diffusive surface 308. Passing through eyepiece optics 310, disseminates light beams 312, thereby creating a wide FOV image on diffusive surface 308. diffusive surface 308 diffusively reflects light beams 312 backward through eyepiece optics 310, toward to the observer. Thus, diffusive surface 308 combines the induced image light and the scene image and projects both through eyepiece optics 310, as light beams 318, toward observer 316, using the entire FOV, available by eyepiece optics 310.

According to another embodiment of the disclosed technique, the induced image source can be located outside the light intensifying apparatus. A micro-mirror may reflect the light beams of the induced image towards the diffusive surface.

Figure 5:
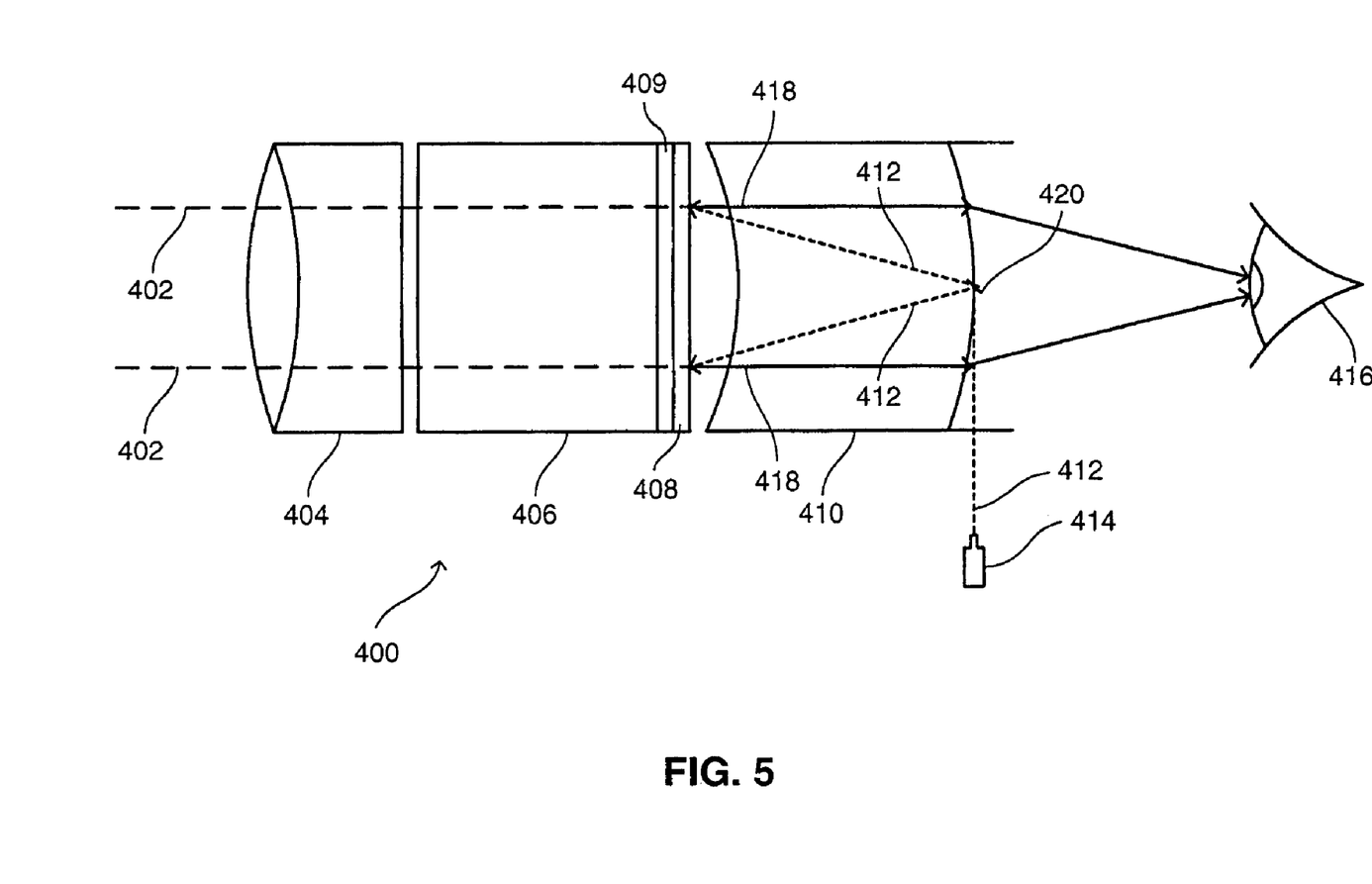
FIG. 5 is a schematic illustration of an image combining apparatus, constructed and operative in accordance with another embodiment of the disclosed technique.

Reference is now made to FIG. 5, which is a schematic illustration of an image combining apparatus, generally referenced 400, constructed and operative in accordance with another embodiment of the disclosed technique. Apparatus 400 includes an objective optics 404, eyepiece optics 410, an induced image source 414 (i.e., an image director), a micro-mirror 420 and an image generator 406, a diffusive surface 408 and an image generator 406 having a display screen 409. diffusive surface 408 is located between eyepiece optics 410 and display screen 409. Image generator 406 is located between display screen 409 and objective optics 404. Induced image source 414 is located outside apparatus 400. Micro-mirror 420 is located in front of eyepiece optics 410. Micro-mirror 420 is small in size and essentially does not disturb the FOV of observer 416.

Light beams 402, of the scene image (not shown), pass through objective optics 404 into image generator 406. Image generator 406 generates an image on display screen 409. Display screen 409 projects the generated image through diffusive surface 408 towards eyepiece optics 410.

Induced image source 414 projects light beams 412 toward micro-mirror 420. Micro-mirror 420 deflects light beams 412 through eyepiece optics 410 towards diffusive surface 408. Passing through eyepiece optics 410, disseminates light beams 412, thereby creating a wide FOV image on diffusive surface 408. diffusive surface 408 diffusively reflects light beams 412 backward through eyepiece optics 410, toward to the observer. Thus, diffusive surface 408 combines the induced image light and the scene image and projects both through eyepiece optics 410, as light beams 418, toward observer 416, using the entire FOV, available by eyepiece optics 410.

Alternatively, micro-mirror 420 may be replaced with a micro-combiner thereby reducing the disturbance to the FOV of observer 416.

According to a further embodiment of the disclosed technique, the induced image source can be located anywhere outside the light intensifying apparatus. The induced image is directed to the light intensifying apparatus. For example, an optic fiber directs the induced image light beams to the front lens of the eyepiece optics. The optic fiber projects the induced narrow FOV image light beams through the eyepiece optics towards the diffusive surface.

Figure 6:
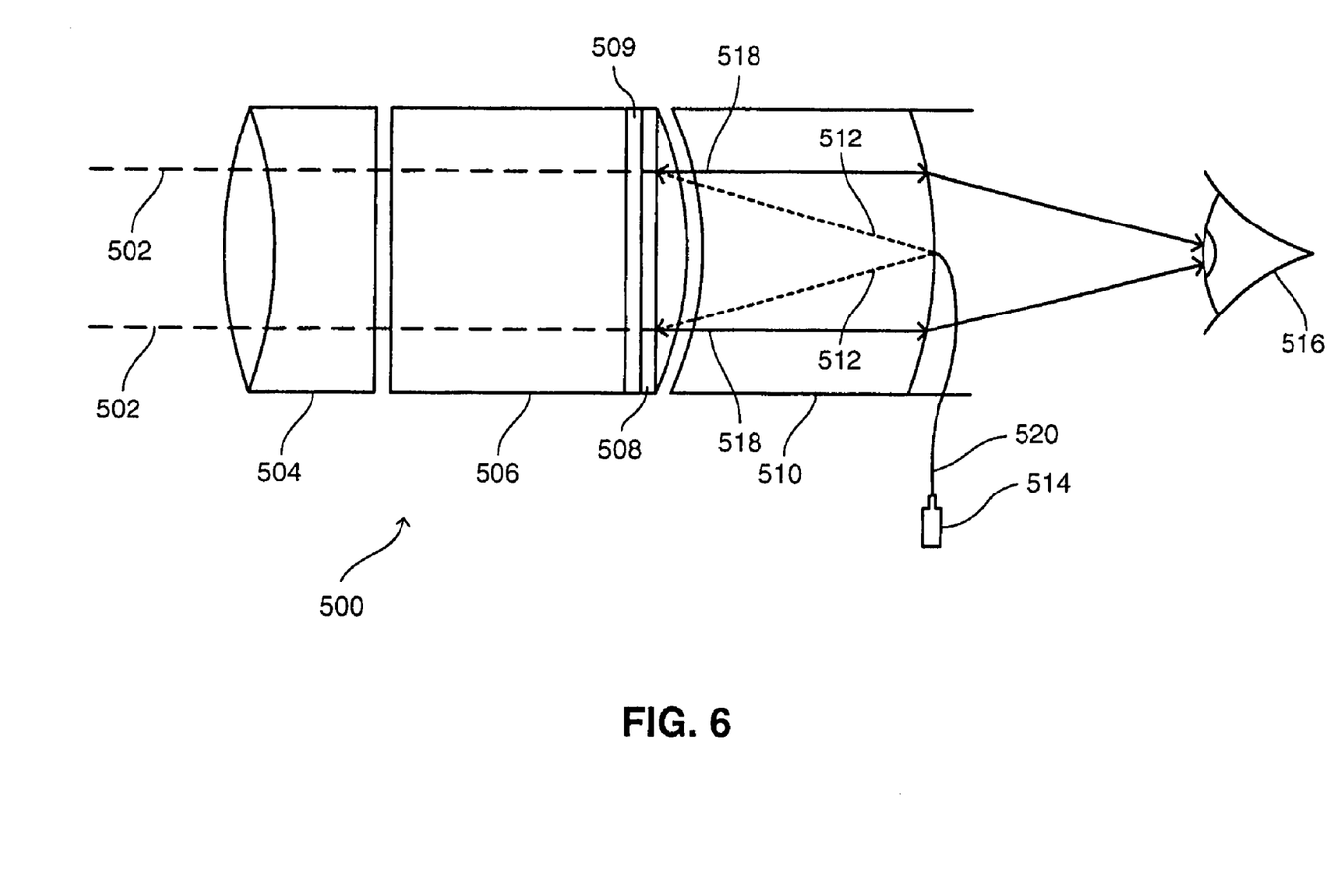
FIG. 6 is a schematic illustration of an image combining apparatus, constructed and operative in accordance with a further embodiment of the disclosed technique.

Reference is now made to FIG. 6, which is a schematic illustration of an image combining apparatus, generally referenced 500, constructed and operative in accordance with a further embodiment of the disclosed technique. Apparatus 500 includes an objective optics 504, eyepiece optics 510, an induced image source 514 (i.e., an image director), an optic fiber 520, a diffusive surface 508 and an image generator 506 having a display screen 509. diffusive surface 508 is located between eyepiece optics 510 and display screen 509. Image generator 106 is located between display screen 509 and objective optics 504. Induced image source 514 is located outside apparatus 500. Optic fiber 520 couples induce image source 514 with eyepiece optics 510's front lens. The portion of optic fiber 520, which resides in the FOV of observer 516, is essentially small in size, so as to inflict a negligible disturbance to the FOV of observer 516.

Light beams 502, of the scene image (not shown), pass through objective optics 504 into image generator 506. Image generator 506 generates an image of the scene on display screen 509. Display screen 509 and projects the generated image through diffusive surface 508 towards eyepiece optics 510.

Induced image source 514 injects an image into optic fiber 520. Optic fiber 520 directs the induce image to eyepiece optics and projects light beams 512 through eyepiece optics 510 towards diffusive surface 508. Passing through eyepiece optics 510, disseminates light beams 512, thereby creating a wide FOV image on diffusive surface 508. diffusive surface 508 diffusively reflects light beams 512 backward through eyepiece optics 510, toward to the observer. Thus, diffusive surface 508 combines the induced image light and the scene image and projects both through eyepiece optics 510, as light beams 518, toward observer 516, using the entire FOV, available by eyepiece optics 510.

It will be appreciated by persons skilled in the art that the disclosed technique is not limited to what has been particularly shown and described hereinabove. Rather the scope of the disclosed technique is defined only by the claims, which follow.

What is claimed is:

1. Device for combining a scene image, produced by an imaging system, with an induced image, the imaging system including eyepiece optics and at least a display screen producing said scene image, the eyepiece optics being optically located between the display screen and the eye of the observer, the device comprising:
    an image director projecting said induced image toward a diffusive surface, said diffusive surface being located between said display screen and said eyepiece optics,
    wherein said diffusive surface reflects said induced image back, toward said observer, through said eyepiece optics, and
    wherein said diffusive surface transmits said scene image from said display screen toward said observer, through said eyepiece optics.

2. The device according to claim 1, wherein said image director is located within said eyepiece optics.

3. The device according to claim 1, wherein said image director is located outside said eyepiece optics.

4. The device according to claim 1, wherein said image director comprises a mirror.

5. The device according to claim 1, further comprising an image source, optically coupled with said image director.

6. The device according to claim 5, wherein said image source is selected from the list consisting of:
    Organic LED display;
    LCD display;
    Plasma display;
    CRT;
    Laser source; and
    Combined image source.

7. The device according to claim 1, wherein said diffusive surface is semi-diffusive.

8. The device according to claim 1, wherein said diffusive surface is combined with said display screen.

9. The device according to claim 1, wherein said imaging system comprises a light intensifier.

10. Image combining system comprising:
    an imaging system including eyepiece optics and at least a display screen producing a scene image, said eyepiece optics being optically located between the display screen and the eye of an observer;
    a diffusive surface, located between said display screen and said eyepiece optics; and
    an image director, projecting an induced image toward a diffusive surface,
    wherein said diffusive surface reflects said induced image back, toward said observer, through said eyepiece optics, and wherein said diffusive surface transmits said scene image from said display screen toward said observer, through said eyepiece optics.

11. The system according to claim 10, further comprising objective optics located in front of said imaging system and directed toward a scene.

12. The system according to claim 10, wherein said image director is located within said eyepiece optics.

13. The system according to claim 10, wherein said image director is located outside said eyepiece optics.

14. The system according to claim 10, wherein said image director comprises a mirror.

15. The system according to claim 10, further comprising an image source, optically coupled with said image director and located outside said eyepiece optics.

16. The system according to claim 15, wherein said image source is selected from the list consisting of:
Organic LED display;
LCD display;
Plasma display;
CRT;
Laser source; and
Combined image source.

17. The system according to claim 10, wherein said diffusive surface is semi-diffusive.

18. The system according to claim 10, wherein said diffusive surface is combined with said display screen.

19. The system according to claim 10, wherein said imaging system comprises a light intensifier.

20. Method for combining a scene image, produced by an imaging system, with an induced image, the imaging system including eyepiece optics and a at least a display screen producing said scene image, the eyepiece optics being optically located between the display screen and the eye of the observer, the method comprising the procedures of:

directing said induced image toward a diffusive surface, said diffusive surface being located between said display screen and said eyepiece optics, reflecting said induced image by said diffusive surface back, toward said observer, through said eyepiece optics, and transmitting said scene image by said diffusive surface, from said display screen toward said observer, through said eyepiece optics.

* * * * *